United States Patent
Figura

(10) Patent No.: US 7,694,553 B2
(45) Date of Patent: Apr. 13, 2010

(54) METHOD FOR CALIBRATING A TURBOCHARGER

(75) Inventor: Giorgio Figura, Epinal (FR)

(73) Assignee: Honeywell International Inc., Morristown, NJ (US)

( * ) Notice: Subject to any disclaimer, the term of this patent is extended or adjusted under 35 U.S.C. 154(b) by 2 days.

(21) Appl. No.: 12/240,037

(22) Filed: Sep. 29, 2008

(65) Prior Publication Data

US 2009/0049900 A1 Feb. 26, 2009

Related U.S. Application Data

(62) Division of application No. 11/458,013, filed on Jul. 17, 2006, now Pat. No. 7,428,839.

(51) Int. Cl.
*G01M 15/14* (2006.01)
(52) U.S. Cl. .................................. 73/112.01
(58) Field of Classification Search .............. 73/112.01, 73/112.03, 112.05
See application file for complete search history.

(56) References Cited

U.S. PATENT DOCUMENTS

| | | | | |
|---|---|---|---|---|
| 6,543,227 B2* | 4/2003 | He et al. | ......................... | 60/602 |
| 7,509,804 B2* | 3/2009 | Kobayashi | ................... | 60/602 |
| 2007/0227603 A1* | 10/2007 | Perrin et al. | ................... | 138/43 |
| 2008/0011071 A1* | 1/2008 | Figura | ....................... | 73/118.1 |

FOREIGN PATENT DOCUMENTS

WO   WO 2005/059317   *  6/2005

\* cited by examiner

*Primary Examiner*—Eric S McCall

(57) ABSTRACT

A calibration flow position of a variable nozzle (6) of a turbocharger is set by a method for calibrating the turbocharger, which comprises a turbine (2) and a compressor (1). In this method, the turbocharger is driven by a predetermined fluid supply. Further, the flow position of the variable nozzle (6) is changed while the rotational speed (N) of the turbocharger or an outlet pressure ($P_{2C}$) of the compressor (1) is monitored. The calibration flow position is fixed based on the monitored quantities.

6 Claims, 3 Drawing Sheets

METHOD FOR CALIBRATING A TURBOCHARGER

CROSS-REFERENCE TO RELATED APPLICATION

This application is a divisional of U.S. patent application Ser. No. 11/458,013 filed on Jul. 17, 2006, now issued as U.S. Pat. No. 7,428,839, the entire disclosure of which is incorporated herein by reference.

BACKGROUND OF THE INVENTION

The present invention relates a method for calibrating a turbocharger comprising a turbine and a compressor to set a calibration flow position of a variable nozzle of the turbocharger.

In order to enhance the thermal efficiency of combustion engines to decrease the fuel consumption thereof turbocharger systems comprising a variable nozzle (VNT) are widely used. Such a variable nozzle is adjustable such that the passage area and/or the geometry of the nozzle can be set between a minimum flow position and a maximum flow position.

According to the known technology, the variable nozzle is operated by an actuating mechanism which is provided with stop positions for he maximum flow position and the minimum flow position. In such systems it is assumed that the mechanical and the flow related structure of each single turbocharger is in a certain range. However, recent requirements regarding exhaust measurements of internal combustion engines equipped with such turbocharger systems became stricter. Therefore, deviations between individual turbocharger products are no longer negligible.

BRIEF SUMMARY OF THE INVENTION

It is the object of the present invention to provide a method for calibrating a, turbocharger which can decrease the deviation of characteristics between individual turbocharger products, in particular in the minimum flow position thereof.

The object is solved by a method for calibrating a turbocharger having the features of the independent claims. Further advantageous developments are defined in the dependent claims.

According to a first aspect of the present invention, the method for calibrating a turbocharger, comprising a turbine and a compressor, to set a calibration flow position of variable nozzle of said turbocharger comprises the steps of driving the turbocharger by a predetermined fluid supply, changing the flow position of said variable nozzle while monitoring the speed of the turbocharger, setting the flow position of the variable nozzle as calibration flow position when the monitored speed of the turbocharger reaches a predetermined speed.

According to the first aspect of the present invention, the turbocharger is calibrated based on the speed of the turbocharger. Thereby differences among individual products which affect the characteristic of the turbocharger system can be adjusted considering the speed of the turbocharger as being a necessarily constant value.

According to a second aspect of the present invention, the method for calibrating a turbocharger, comprising a turbine and a compressor, to set a calibration flow position of a variable nozzle of said turbocharger comprises the steps of driving the turbocharger by a predetermined fluid supply, changing the flow position of said variable nozzle while monitoring the outlet pressure of said compressor, setting the flow position of the variable nozzle as calibration flow position when the monitored outlet pressure of said compressor reaches a predetermined pressure.

According to the second aspect of the present invention, the compressor outlet pressure is employed as value which is to be kept constant among individual products in order to compensate for any deviations which are caused by the manufacture of the turbocharger system.

It is noted that the solutions according to the first aspect and according to the second aspect of the present invention can be appropriately combined with each other. In particular, both the speed of the turbocharger and the outlet pressure of the compressor can be used for calibrating the minimum flow position of the turbocharger system.

According to a preferable form of the present invention, the calibration flow position is the minimum flow position of said variable nozzle. In particular, the minimum flow position is a delicate part of the range of the nozzle at which changes are caused by the manufacture of the turbocharger system. Therefore, calibrating the flow position at the minimum flow position is most advantageous.

According to a preferable form of the present invention, the flow position of the variable nozzle is changed from an open position towards a closed position in the step of changing the flow position. Changing the flow position of the variable nozzle from an open position towards a closed position corresponds to one of the actual operations of the turbocharger system. Therefore, the calibration accuracy, can be enhanced.

According to a preferable form of the present invention, for driving the turbocharger by the predetermined fluid supply, air is supplied to an inlet of the turbine of the turbocharger through said variable nozzle. Air can be handled in a simple manner and provided at any test bench.

According to a preferable form of the present invention, the pressure and/or temperature of the air supply are monitored. The knowledge of the pressure and/or the temperature of the air supply is an option to improve the repeatability of the calibration method.

According to a preferable form of the present invention, the pressure and/or temperature of the air supply are controlled so to be substantially constant. As stated above, the repeatability of the calibration method, can be improved. Therefore, the thermodynamics of the air supply should be the same among all turbochargers calibrated by the method according to the present invention.

According to a preferable form of the present invention an outlet of the turbine is unrestricted. Keeping the outlet of the turbine unrestricted, that is, without arranging any orifice at the outlet, further enhances the repeatability of the calibration.

According to a preferable form of the present invention, lubricant is supplied to and discharged from portions of the turbocharger to be lubricated. The lubrication of the turbocharger system is necessary in order to provide an operation state of the turbocharger system which is comparable to the actual operation. This further enhances the accuracy of the calibration.

According to a preferable form of the present invention, pressures and/or temperatures of the lubricant supplied to and discharged from the turbocharger are monitored. Further, the pressures and/or temperatures of the lubricant supplied to and discharged from the turbocharger are controlled so as to be within predetermined ranges. Keeping the pressures and/or temperatures of the lubricant within predetermined ranges further improves the repeatability of the calibration and provides a defined operation state.

According to a preferable form of the present invention, an inlet of said compressor is connected to ambient air and an outlet thereof is provided with a restricted orifice. Providing a restricted orifice at the outlet of the compressor improves the accuracy of the calibration since the detection of the pressure at the outlet of the restricted orifice is facilitated. In particular, the thermodynamics of the compressor comprising a restricted orifice at its outlet is adapted for the calibration method according to the present invention.

According to a preferable form of the present invention, temperatures and/or pressures of air at the inlet and/or outlet of the compressor are monitored. In order to provide defined operational states of the turbocharger system, the thermodynamic quantities of the compressor system should be available. This further increases the repeatability of the calibration.

According to a preferable form of the present invention, an actuating speed for changing the flow position of the variable nozzle is set such that the speed of the turbocharger is at least close to a steady-state speed.

Furthermore, it is preferable to set the actuating speed for changing the flow position of the variable nozzle such that the outlet pressure of the compressor is at least close to a steady-state pressure. Employing the steady-state speed and/or the steady-state pressure of the turbocharger increases the accuracy of the calibration, since any deviations due to control variations of the quantities in question are eliminated.

According to a preferable form of the present invention the determined calibration flow position is set as a stop at an actuation mechanism of the turbocharger. Preferably said stop is formed as an adjustable and fixable element for defining the determined calibration flow position. Thereby, the determined calibration flow position can be capped and fixedly adjusted such that the turbocharger system can be provided with this calibrated flow position which is unchangeable.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

First Embodiment

Figure 1:
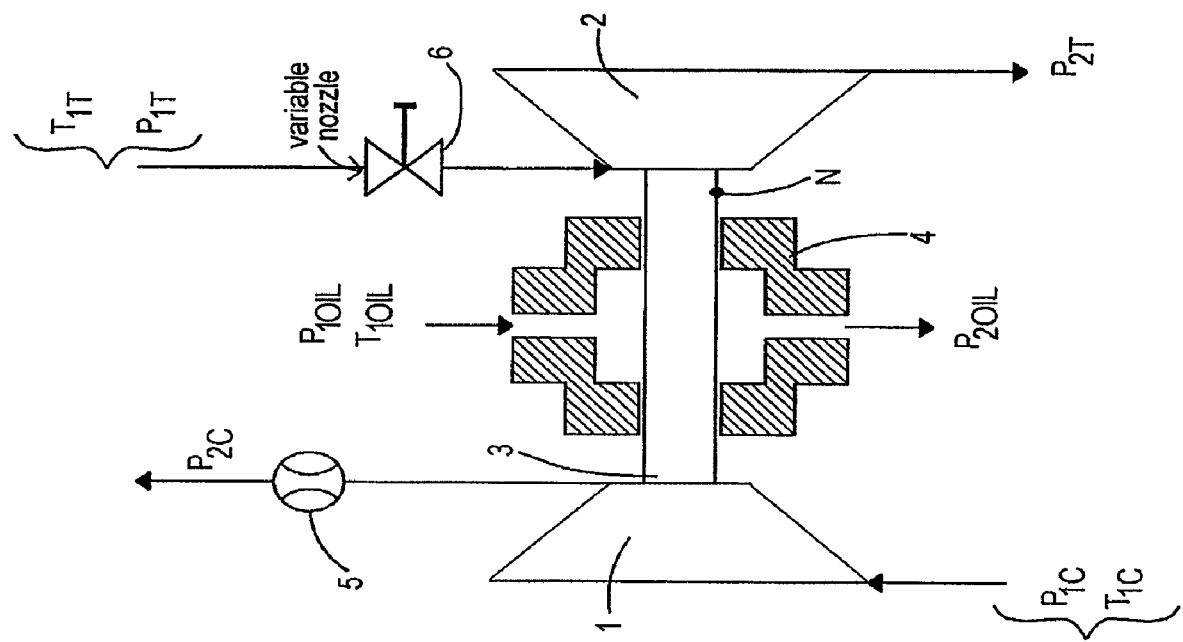
FIG. 1 is a schematic view of the turbocharger system which is prepared for the calibration on a bench.
Figure 1:
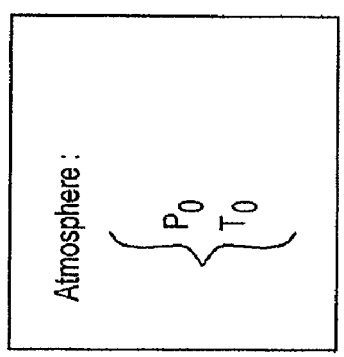

FIG. 1 shows the turbocharger system which is prepared for the calibration method according to the present invention. It is noted that the view of FIG. 1 merely shows essential parts of the turbocharger and further details which are necessary for the explanation of a calibration method according to the present invention.

The turbocharger according to FIG. 1 comprises a compressor 1 and a turbine 2 which are connected by a shaft 3. In the drawing, the compressor 1 is represented by a compressor wheel and the turbine 2 is represented by a turbine wheel. The shaft 3 is rotatably supported by a bearing assembly 4 which is formed by a fluid bearing operated by oil supply.

The compressor 1 comprises an inlet and an outlet. At the outlet of the compressor, an orifice 5 is provided. This orifice 5 comprises a fixed throttle effect.

The turbine 2 of the turbocharger comprises an inlet and an outlet. At the inlet, a variable nozzle 6 with a known structure is provided. This variable nozzle can be formed by an insert which is displaceable along the axial direction of the turbocharger, by an arrangement including vanes which re provided in an annular passage for passing the fluid for driving the turbine or by a combination thereof. In the following, the structure of the variable nozzle is not limited as long as the nozzle can be adjusted between a minimum flow position and a maximum flow position.

For performing the calibration method according to the present invention, the turbocharger is mounted on a test bench (not shown). Next the bearing arrangement 4 is connected to an oil supply. The outlet of the bearing arrangement 4 is connected to an oil discharge.

The inlet of the compressor is connected to the atmosphere. The pressure at the outlet of the orifice 5 is monitored as compressor outlet pressure $P_{2C}$.

The inlet of the turbine is connected to an air supply. The temperature and the pressure of the air supply is monitored. In particular, the value of the turbine inlet temperature $T_{1T}$ and the value of the turbine inlet pressure $P_{1T}$ are detected. Furthermore, the outlet of the turbine is connected to a test bench exhaust system. The turbine outlet pressure $P_{2T}$ is monitored The turbocharger system which is mounted on the test bench is provided with a speed sensor for detecting the speed N of the shaft 3. Moreover, the pressure and the temperature of the atmosphere $P_0$ and $T_0$ are detected.

The detected values $P_{1\ OIL}$, $T_{1\ OIL}$, $P_{2\ OIL}$, $P_{1C}$, $T_{1C}$, $P_{2C}$, $T_{1T}$, $P_{1T}$, $P_{2T}$, $P_0$, $T_0$ are supplied to a control unit which is not shown. The control unit can be any computer like system which is capable of receiving, displaying and processing the above-mentioned detection values.

In order to prepare the turbocharger for the calibration method, in the turbocharger mounted on the test bench, the inlet of the turbine 2 is connected to the air supply, the inlet of the bearing assembly 4 and the outlet thereof are connected to the oil supply and the oil discharge, respectively, and the detection of the above-mentioned quantities is started.

Figure 2:
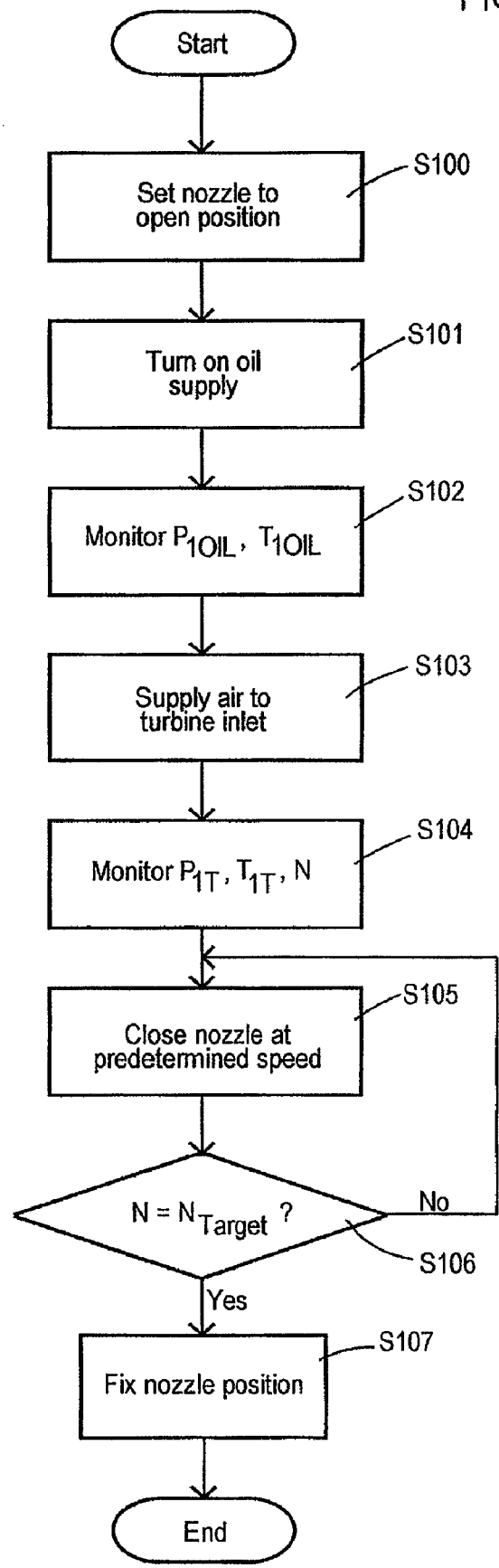
FIG. 2 shows a flow chart of the calibration method according to a first embodiment of the present invention.

The calibration method according to the first embodiment of the present invention is explained based on FIG. 2.

In step S100, the variable nozzle 6 are set to an open position. In particular, the variable nozzle 6 is actuated such that the position thereof is substantially different from the closed position.

In step S101, the oil supply is turned on. Furthermore, in step S102, $P_{1\ OIL}$ and $T_{1\ OIL}$, $P_{2\ OIL}$ are monitored such that the values thereof are within a certain predetermined range.

In step S103, air is supplied to the turbine inlet. In particular, the flow rate of the supplied air is slowly increased from zero in order to start the operation of the turbocharger. The flow rate is increased slowly in order to increase the speed of the turbocharger and, thus, the compressor outlet pressure $P_{2C}$ at the outlet of the compressor 1.

In step S104, the values $P_1$, $T_{1T}$, N are monitored. In particular, the turbine inlet pressure $P_{1T}$ and the turbine inlet temperature $T_{1T}$ are monitored such that the same are within a predetermined range. This process can be automated by any known control system which provides a closed loop control.

After the turbocharger system reaches and maintains the defined operation state, which means, that $P_{1\ OIL}$, $T_{1\ OIL}$, $P_{2\ OIL}$, $P_{1T}$, $T_{1T}$ are within predetermined ranges, the variable nozzle 6 is closed at a predetermined actuating speed. This actuating speed is determined such that the change of the rotational speed N of the turbocharger and/or the compressor outlet pressure $P_{2C}$ of the compressor of the turbocharger changes that slowly such that an operation state is established which is at least close to the steady-state operation.

In step S106, a turbocharger speed N is compared with a predetermined target speed $N_{TARGET}$. If the turbocharger speed has not reached the target speed $N_{TARGET}$, the variable nozzle 6 is further closed at the predetermined actuating speed as defined in step S105. Once the turbocharger speed N has reached target speed $N_{TARGET}$, the vane position is fixed.

As an option, the position of the variable nozzle 6 can be kept unchanged for a predetermined period after the predetermined target speed $N_{TARGET}$ of the turbocharger is reached in order to make sure that the operation is in a steady-state.

In particular, the vane position is fixed by adjusting a set screw forming a stop of the actuating mechanism of the variable nozzle 6. However any other means for fixing the vane position can be used as long the minimum flow position of the nozzle is defined while the nozzle can be opened.

After fixing the position of the variable nozzle 6, the calibration is complete. Therefore, any lines and supplies are removed and the turbocharger system is removed from the test bench.

After the removal of the turbocharger, the next turbocharger can be calibrated by the same method. The above mentioned ranges and quantities must be constant for each individual product of a respective line of turbochargers of a specific type.

According to the basic concept of the present invention the minimum flow position of the variable nozzle 6 is calibrated by employing the rotational speed N of the turbocharger as calibration quantity. This means, that each individual turbocharger product of certain product line will reach e target speed $N_{TARGET}$ at the minimum flow position of the variable nozzle 6 under the condition that the remaining quantities are constant.

Second Embodiment

Figure 3:
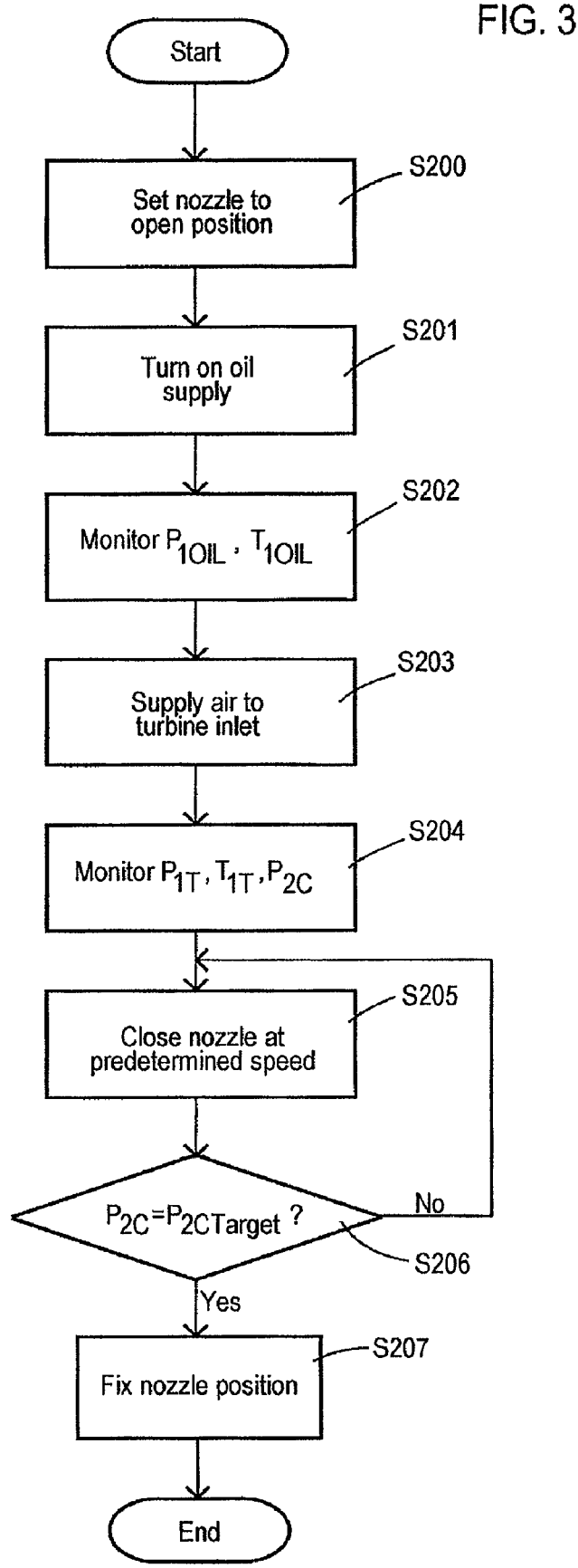
FIG. 3 shows a flow chart of a second embodiment of the calibration method of the present invention.

A second embodiment of the present invention is explained based on FIG. 3. The arrangement of the turbocharger system on the test bench is the same as in the first embodiment In the following, merely the differences between the first embodiment and the second embodiment are explained. In the second embodiment, the calibration method is performed for the turbocharger which is mounted on the test bench. According to this method, the variable nozzle 6 is set to an open position (S200), the oil supply is turned on (S201), $P_{1\ OIL}$, $T_{1\ OIL}$ are monitored (S202), and air is supplied to the turbine inlet (S203), as in the first embodiment.

In step S204, the turbine inlet pressure $P_{1T}$, the turbine inlet temperature $T_{1T}$ and the compressor outlet pressure $P_{2C}$ are monitored.

Ten, in step S205, the variable nozzle is closed at the predetermined actuating speed corresponding to step S105 of the first embodiment.

The main difference between the first embodiment and e second embodiment is at in step S206, the monitored compressor outlet pressure $P_{2C}$ is compared with a predetermined target pressure $P_{2C\ TARGET}$. This means, that the calibration of the turbocharger system is based on the fact that the minimum flow position of the vane of the variable nozzle 6 should provide a constant compressor outlet pressure $P_{2C}$ among each individual turbocharger product of a certain product line.

Once the Compressor outlet pressure $P_{2C}$ has reached the target pressure $P_{2C\ TARGET}$, the vane position of the variable nozzle 6 is fixed in step S207 which corresponds to step S107 of the first embodiment. Thereafter, calibration process for this turbocharger is complete and is repeated for further turbochargers of this product line while keeping the above mentioned ranges and quantities constant for the respective product line.

The present invention has been explained based on preferred embodiments. However, the present invention is not limited to the above explained specific embodiments.

In particular the calibration method is not limited to the turbocharger system disclosed in FIG. 1. Rather, any turbocharger system is applicable for the present invention which includes a compressor and a turbine.

The bearing arrangement 4 is not limited to an oil bearing. It is possible to provide any bearing arrangement such as ball bearings, roller bearings, or a combination thereof.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for calibrating a variable nozzle of a turbocharger, the turbocharger having a compressor and a turbine connected by a shaft, a position of the variable nozzle being adjustable by an actuation mechanism connected to the variable nozzle, the position being adjustable between a minimum flow position and a maximum flow position, the method comprising the steps of:
    supplying fluid through the variable nozzle to an inlet of the turbine, and adjusting a flow rate of the fluid until turbine inlet temperature and turbine inlet pressure are within predetermined ranges;
    progressively changing the position of the variable nozzle while monitoring an outlet pressure of the compressor;
    determining that the minimum flow position of the variable nozzle has been reached when the outlet pressure of the compressor reaches a predetermined pressure; and
    fixing a mechanical stop for the actuation mechanism while the variable nozzle is in the minimum flow position.

2. The method of claim 1, wherein the position of the variable nozzle is changed from an open position towards a closed position to reach the minimum flow position.

3. The method of claim 1, wherein during the supplying step air is supplied to the inlet of the turbine through the variable nozzle, wherein the pressure and/or temperature of the air supply are controlled so as to be substantially constant.

4. The method of claim 1, wherein pressures and/or temperatures of lubricant supplied to and discharged from the turbocharger are controlled so as to be within predetermined ranges.

5. The method of claim 1, wherein temperatures and/or pressures at the inlet and/or outlet of the compressor are controlled so as to be within predetermined ranges.

6. The method of claim 1, wherein during the step of progressively changing the position of the variable nozzle, a rate of change of the position of the variable nozzle is such that the speed of the turbocharger and/or the outlet pressure of the compressor is at least close to a steady-state value.

* * * * *